US010166783B2

(12) United States Patent
Sugaya et al.

(10) Patent No.: US 10,166,783 B2
(45) Date of Patent: Jan. 1, 2019

(54) INK JET RECORDING APPARATUS

(71) Applicant: Konica Minolta, Inc., Tokyo (JP)

(72) Inventors: Toyoaki Sugaya, Hachioji (JP);
Toshiyuki Mizutani, Hino (JP);
Toshiyuki Takabayashi, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/572,419

(22) PCT Filed: May 9, 2016

(86) PCT No.: PCT/JP2016/063691
§ 371 (c)(1),
(2) Date: Nov. 7, 2017

(87) PCT Pub. No.: WO2016/181914
PCT Pub. Date: Nov. 17, 2016

(65) Prior Publication Data
US 2018/0141346 A1 May 24, 2018

(30) Foreign Application Priority Data

May 11, 2015 (JP) .................................. 2015-096176

(51) Int. Cl.
*B41J 3/60* (2006.01)
*B41J 13/08* (2006.01)
(Continued)

(52) U.S. Cl.
CPC .................. *B41J 3/60* (2013.01); *B41J 2/01* (2013.01); *B41J 2/045* (2013.01); *B41J 2/17593* (2013.01);
(Continued)

(58) Field of Classification Search
CPC ... B41J 3/60; B41J 2/2114; B41J 2/155; B41J 11/0015; B41J 11/002; B41J 13/009; B41J 13/08
See application file for complete search history.

(56) References Cited

U.S. PATENT DOCUMENTS

2007/0291071 A1* 12/2007 Nakazawa ............. B41J 2/2114
347/21
2010/0194838 A1* 8/2010 Mitsuzawa ............ B41J 2/2114
347/102
(Continued)

FOREIGN PATENT DOCUMENTS

CN    103373084 A    10/2013
EP    2 657 025 A1   10/2013
(Continued)

OTHER PUBLICATIONS

International Search Report dated Aug. 2, 2016 for PCT/JP2016/063691 and English translation.
(Continued)

*Primary Examiner* — Geoffrey S Mruk
*Assistant Examiner* — Scott A Richmond
(74) *Attorney, Agent, or Firm* — Lucas & Mercanti, LLP (57) ABSTRACT

An ink jet recording apparatus includes an ejector, a fixing unit, a reversing unit and a hardware processor. The ejector performs an ejection operation of ejecting a color material and an overcoat material onto a recording medium. The fixing unit fixes the overcoat material, thereby forming an overcoat on the medium. The reversing unit reverses the medium. The processor causes the fixing unit to form the overcoat on one side of the medium after causing the ejector to perform the ejection operation on the one side at a predetermined ejection position, causes the reversing unit to reverse the medium with the overcoat formed on the one side, and causes the fixing unit to form the overcoat on the
(Continued)

other side of the medium after causing the ejector to perform the ejection operation on the other side at the ejection position.

15 Claims, 4 Drawing Sheets

(51) Int. Cl.
    *B41J 2/01*         (2006.01)
    *B41J 2/21*         (2006.01)
    *B41J 29/00*       (2006.01)
    *B41J 2/045*      (2006.01)
    *B41J 2/175*      (2006.01)
    *B41J 11/00*      (2006.01)
    *H04N 1/00*      (2006.01)

(52) U.S. Cl.
    CPC ............... *B41J 2/21* (2013.01); *B41J 2/2114* (2013.01); *B41J 11/002* (2013.01); *B41J 11/0015* (2013.01); *B41J 29/00* (2013.01); *H04N 1/0057* (2013.01); *H04N 1/00522* (2013.01)

(56) References Cited

U.S. PATENT DOCUMENTS

| | | | | |
|---|---|---|---|---|
| 2011/0122210 A1* | 5/2011 | Sambhy | ............... | C09D 183/04 347/101 |
| 2011/0193902 A1* | 8/2011 | Yamanobe | ........... | B41J 11/0015 347/9 |
| 2013/0010040 A1* | 1/2013 | Sekiguchi | ............. | C09D 11/38 347/100 |
| 2013/0075968 A1* | 3/2013 | Dunst | ........................ | B41J 3/60 271/3.19 |
| 2015/0138575 A1* | 5/2015 | Takamizawa | ...... | G03G 15/6585 358/1.9 |

FOREIGN PATENT DOCUMENTS

| | | |
|---|---|---|
| JP | 2011143628 A | 7/2011 |
| JP | 2013215995 A | 10/2013 |
| JP | 2013230600 A | 11/2013 |
| JP | 2014210438 A | 11/2014 |
| WO | 2011065095 A1 | 6/2011 |

OTHER PUBLICATIONS

International Preliminary Report on Patentability, PCT/JP2016/063691, dated Nov. 14, 2017, English translation included.
Extended European Search Report dated Apr. 10, 2018 from corresponding European Application No. 16792639.3.
Office Action dated Sep. 3, 2018 for the Chinese Patent Application No. 201680026410.0 and English translation.

\* cited by examiner

INK JET RECORDING APPARATUS

CROSS REFERENCE TO RELATED APPLICATION

This Application is a 371 of PCT/JP2016/063691 filed on May 9, 2016, which, in turn, claimed the priority of Japanese Patent Application No. JP 2015-096176 filed on May 11, 2015, both applications are incorporated herein by reference.

TECHNOLOGICAL FIELD

The present invention relates to an ink jet recording apparatus.

BACKGROUND ART

There has been an ink jet recording apparatus that records images on recording media by ejecting inks onto the recording media from nozzles of an ejector(s). This kind of ink jet recording apparatus includes an ink jet recording apparatus that ejects, besides inks that form recorded images, an overcoat material onto recording media and fixes the overcoat material on the recording media, thereby forming overcoats. (Refer to, for example, Patent Document 1.) Forming overcoats on recording media can protect the surface of the recording media and/or provide the recording media with appropriate gloss.

If an ink jet recording apparatus records images on both sides of a recording medium, it is desired to form overcoats on both sides of the recording medium. Patent Document 2 describes a technology of, with two units which perform printing and varnish-coating (i.e. overcoat forming), performing printing and varnish-coating on one side of a recording medium with one of the units, reversing the recording medium with a sheet reversing unit, and performing printing and varnish-coating on the other side of the recording medium with the other unit.

RELATED ART DOCUMENTS

Patent Documents

Patent Document 1: Japanese Patent Application Publication No. 2013-215995
Patent Document 2: Japanese Patent Application Publication No. 2014-210438

SUMMARY OF THE INVENTION

Problems to be Solved by the Invention

However, if an ink jet recording apparatus is provided with separate ejectors to form overcoats on respective sides of a recording medium, the apparatus becomes large, which tends to result in high cost.

An object of the present invention is providing a small ink jet recording apparatus that can form overcoats on both sides of a recording medium.

Means for Solving the Problems

One embodiment of the invention of an ink jet recording apparatus is an ink jet recording apparatus including:
an ejector that performs an ejection operation of ejecting a color material that forms an image and an overcoat material onto a recording medium;
a fixing unit that fixes the overcoat material ejected onto the recording medium by the ejector, thereby forming an overcoat on the recording medium;
a reversing unit that reverses the recording medium; and
a hardware processor that causes the fixing unit to form the overcoat on one side of the recording medium after causing the ejector to perform the ejection operation on the one side at a predetermined ejection position, causes the reversing unit to reverse the recording medium with the overcoat formed on the one side, and causes the fixing unit to form the overcoat on other side of the recording medium opposite to the one side after causing the ejector to perform the ejection operation on the other side at the predetermined ejection position.

Advantageous Effects of the Invention

According to the present invention, there is an effect of providing a small ink jet recording apparatus that can form overcoats on both sides of a recording medium.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

EMBODIMENTS FOR CARRYING OUT THE INVENTION

Hereinafter, one or more embodiments of the present invention will be described with reference to the drawings. However, the scope of the invention is not limited to the disclosed embodiments.

Hereinafter, one or more embodiments of an ink jet recording apparatus of the present invention are described on the basis of the drawings.

According to one embodiment of the present invention, there is an effect of providing a small ink jet recording apparatus that can form overcoats on both sides of a recording medium.

Figure 1:
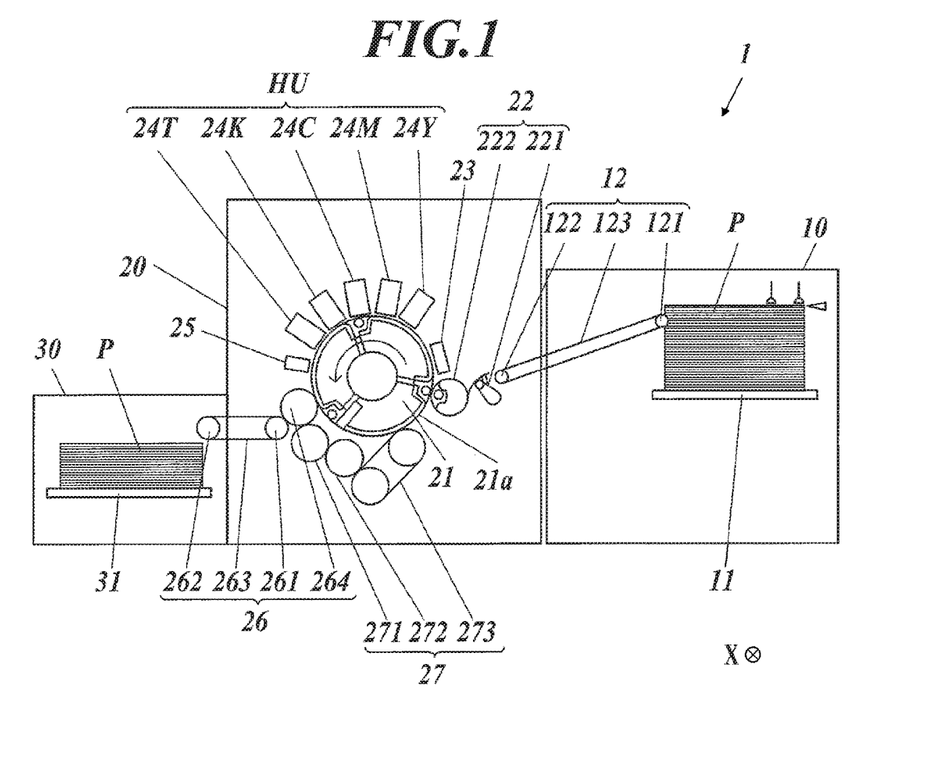
FIG. 1 is a schematic diagram of the configuration of an ink jet recording apparatus that is an embodiment(s) of the present invention.

FIG. 1 is a schematic diagram of the configuration of an ink jet recording apparatus 1 that is an embodiment(s) of the present invention.

Figure 2:
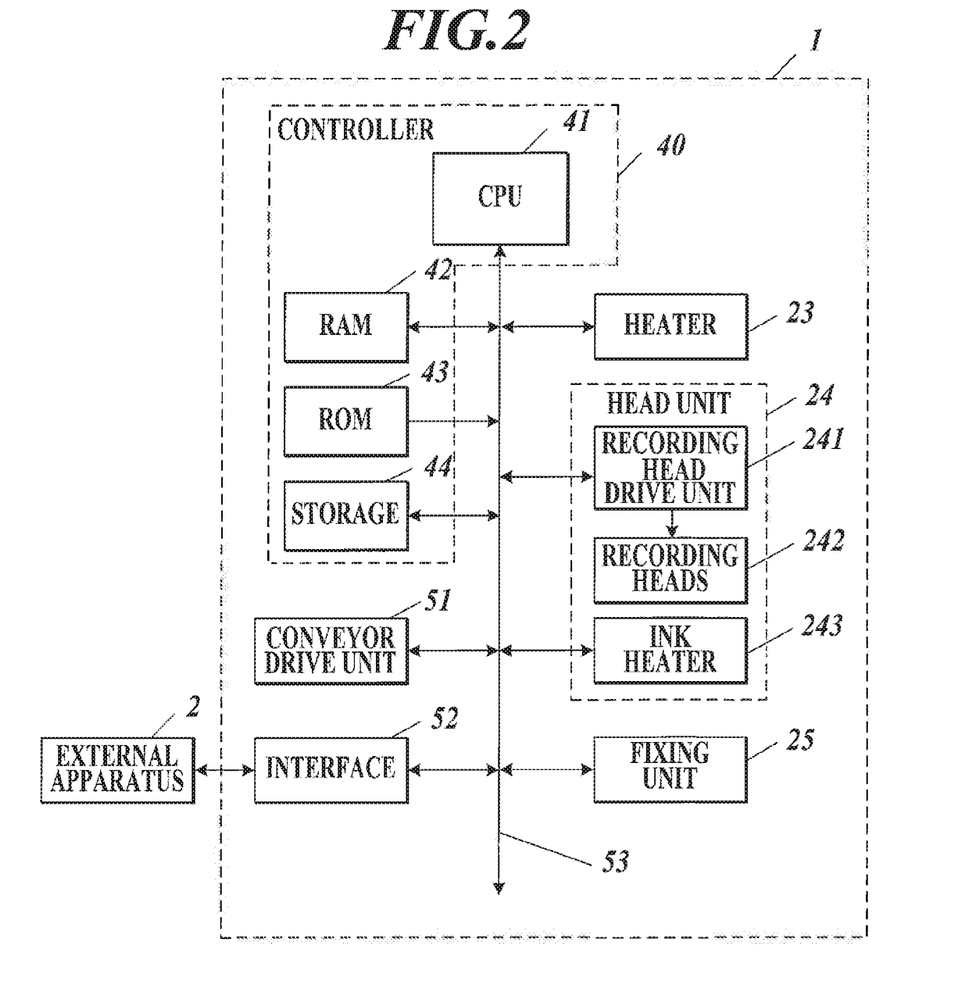
FIG. 2 is a block diagram of main functional components of the ink jet recording apparatus.

The ink jet recording apparatus 1 includes a sheet feeder 10, an image recorder 20, a sheet receiver 30 and a controller 40 (FIG. 2). Under the control of the controller 40, the ink jet recording apparatus 1 conveys recording media P stored in the sheet feeder 10 to the image recorder 20, records images on the recording media P in the image recorder 20, and conveys the recording media P with the images recorded to the sheet receiver 30. As the recording media P, a variety of media can be used as long as inks (color inks and a clear ink described below) ejected onto the surface thereof can be fixed. Examples thereof include fabrics and sheet-shaped resins in addition to paper exemplified by plain paper and coated paper.

The sheet feeder 10 includes: a sheet feeding tray 11 where the recording media P are stored; and a media supply unit 12 that conveys and supplies the recording media P from the sheet feeding tray 11 to the image recorder 20.

The media supply unit 12 includes a ring-shaped belt 123 the inner side of which is supported by two rollers 121 and 122. The media supply unit 12 conveys the recording media P by rotating the rollers 121 and 122 in a state in which the recording media P are placed on the belt 123.

The image recorder 20 includes a conveyor drum 21 (conveyor), a first delivery unit 22, a heater 23, a head unit group HU (ejector) including head units 24Y, 24M, 24C, 24K and 24T (hereinafter these may be simply referred to as "head units 24"), a fixing unit 25 (fixing unit), a second delivery unit 26 and a reversing unit 27 (reversing unit).

The conveyor drum 21 conveys the recording media P in a predetermined direction while holding the recording media P on its conveyor surface 21a that is a cylindrical outer circumferential surface. The conveyor drum 21 conveys the recording media P in the conveying direction (hereinafter may be referred to as the "Y direction"), which is along the conveyor surface 21a, by rotating around a rotation axis of the conveyor surface 21a in a state in which the recording media P are held on the conveyor surface 21a. The rotation axis extends in the width direction (hereinafter may be referred to as the "X direction"), which is at right angles to the conveying direction and perpendicular to FIG. 1. The conveyor drum 21 has not-shown claw parts and a not-shown suction device to hold the recording media P on the conveyor surface 21a. The recording media P are held on the conveyor surface 21a by the edges of the recording media P being held down with the claw parts and by the recording media P being attracted to the conveyor surface 21a with the suction device.

The conveyor drum 21 is connected to a not-shown conveyor drum motor that rotates the conveyor drum 21, and rotates an angle proportional to the amount of rotation of the conveyor drum motor.

The first delivery unit 22 delivers, to the conveyor drum 21, the recording media P received from the media supply unit 12 of the sheet feeder 10. The first delivery unit 22 is disposed between the media supply unit 12 of the sheet feeder 10 and the conveyor drum 21, and holds and takes up, with a swing arm part 221, one end of each of the recording media P received from the media supply unit 12, and delivers, with a delivery drum 222, the recording media P to the conveyor drum 21.

The heater 23 is disposed on the downstream side of the delivery drum 222 in the conveying direction, and heats the conveyor surface 21a of the rotating conveyor drum 21 and/or the recording media P on the conveyor surface 21a. The heater 23 has, for example, an infrared heater and so forth, and generates heat by electrifying the infrared heater on the basis of control signals supplied from a CPU 41 (FIG. 2). The heater 23 heats the conveyor surface 21a of the conveyor drum 21 that is rotating without the recording media P placed thereon such that the recording media P to be placed on the conveyor surface 21 have a temperature in a predetermined temperature range by the heat conducted from the conveyor surface 21a. Further, while the recording media P are placed on the conveyor surface 21a and being conveyed, the heater 23 heats the recording media P such that the recording media P have a temperature in the predetermined temperature range. The lower limit of the predetermined temperature range is, for example, arbitrarily selected from a temperature range in which inks ejected onto and fixed on the recording media P have sufficient gloss, and the upper limit thereof is, for example, arbitrarily selected from a temperature range in which the inks ejected onto the recording media P quickly solidify. The heater 23 may be disposed on the upstream side of the delivery drum 222 in the conveying direction.

The head unit group HU performs ejection operations of ejecting colored inks (hereinafter may be referred to as the "color inks" (color material)) that form images and a colorless transparent ink (hereinafter may be referred to as the "clear ink" (overcoat material)) onto the recording media P, according to the rotation of the conveyor drum 21 that holds the recording media P on the conveyor surface 21a. More specifically, among the head units 24 of the head unit group HU, the head units 24Y, 24M, 24C and 24K eject the color inks of yellow (Y), magenta (M), cyan (C) and black (K), which form images, respectively, and the head unit 24T ejects the colorless transparent (T) clear ink to, of a recording medium P, the whole image formable region where an image can be formed (hereinafter may be referred to as the "image forming region") by the ink jet recording apparatus 1. This clear ink forms a colorless transparent overcoat(s) by being cured and fixed on the recording medium P. The above image forming region may be a region excluding margins near the edges of the recording medium P or may be the whole recording medium P. Each head unit 24 is disposed such that its ink ejecting surface faces the conveyor surface 21a at a predetermined distance apart. Further, the head unit group HU is configured such that the head units 24Y, 24M, 24C, 24K and 24T are disposed in this order from the upstream side in the recording media P conveying direction at predetermined intervals.

The clear ink and the overcoat composed of the clear ink are not necessarily colorless and transparent.

Each head unit 24 includes: a plurality (e.g. four) of recording heads 242 (FIG. 2) in each of which recording elements are arranged in a direction crossing (in this embodiment, at right angles to) the recording media P conveying direction; and a recording head drive unit 241 that drives the recording heads 242.

The recording head drive unit 241 has: a drive circuit that supplies, to the recording heads 242, voltage signals having drive waveforms corresponding to image data; and a drive control circuit that supplies the image data to the drive circuit at appropriate timings.

Each recording element included in each recording head 242 includes: a pressure chamber where ink is stored; a piezoelectric element disposed on the wall surface of the pressure chamber; and a nozzle. When the drive circuit of the recording head drive unit 241 applies, to the piezoelectric elements, a voltage signal having a drive waveform to transform and operate the piezoelectric elements, the pressure in the pressure chambers changes in response to the voltage signal, and the nozzles that communicate with the pressure chambers eject ink.

The recording head drive units 241 of the head units 24Y, 24M, 24C and 24K drive their recording heads 242 on the basis of image data of their respective color components Y, M, C and K of images to be recorded. Further, the recording head drive unit 241 of the head unit 24T drives its recording heads 242 on the basis of image data (solid image data) composed of only data for ink ejection. Hence, the head unit 24T ejects the same amount of the clear ink to each point on a recording medium P. In this embodiment, therefore, an overcoat(s) having an approximately uniform thickness is formed on a recording medium P.

The array of the recording elements, which are included in each head unit 24, in the X direction covers the width in the X direction of the image forming region of the recording media P, which are held and conveyed by the conveyor drum 21. At the time of recording images, the head units 24 are used with their positions fixed with respect to the conveyor drum 21. That is, the ink jet recording apparatus 1 is an ink jet recording apparatus 1 employing a single-pass system.

As the color inks and the clear ink that are ejected from the nozzles of the recording elements, phase-change photocurable inks that change between the gel phase and the sol phase according to temperature and are cured by being irradiated with light (energy rays), such as ultraviolet rays, are used, for example.

In this embodiment, color inks and a clear ink each of which is a gel at room temperature and solates by heat are used. Each head unit 24 includes an ink heater 243 (FIG. 2) (color material heater, overcoat material heater) that heats the ink stored in a not-shown ink storage included in the head unit 24 and the ink supplied from the ink storage into the recording heads 242. This ink heater 243 operates on the basis of control signals supplied from the CPU 41 (FIG. 2) of the controller 40, and heats the ink in the head unit 24 to a temperature at which the ink solates. The recording heads 242 eject the ink made to solate by being heated. Meanwhile, the temperature of the recording media P on the conveyor surface 21a is a temperature at which the ejected inks gelatinize Hence, when the inks made to solate by being heated by the ink heaters 243 are ejected onto the recording media P, the ejected inks quickly gelatinize and solidify by being cooled on the recording media P.

As each of the color inks, for example, an ink containing a photopolymerizable compound, a photopolymerization initiator, a gelling agent and a colorant is used. Of these, the photopolymerizable compound is a compound that is polymerized by being irradiated with light, such as ultraviolet rays. The photopolymerization initiator is a compound to start the polymerization. The gelling agent is a compound having a property of making the color ink solate by melting in the color ink when the color ink is heated to a solation temperature or more and making the color ink gelatinize by forming a bridged structure or forming a fibrous aggregate when the color ink is cooled to a gelation temperature or less. The colorant contains a pigment or a dye of the color of the color ink.

As the clear ink, for example, an ink containing the above constituents of the color ink except the colorant, i.e. containing a photopolymerizable compound, a photopolymerization initiator and a gelling agent, is used. The compositions of the photopolymerizable compound, the photopolymerization initiator and the gelling agent in the clear ink may be the same as the compositions of those in the color ink, or may be appropriately changed from the compositions of those in the color ink in order to, for example, adjust the curing mode, the gelation temperature and/or the solation temperature.

The clear ink (overcoats) cured and fixed on the recording media P protects the surface of the recording media P and provides the recording media P with appropriate gloss. Further, the color ink(s) having a similar composition to that of the clear ink, except for containing the colorant, also protects the surface of the recording media P and provides the recording media P with appropriate gloss when cured and fixed on the recording media P, as with the overcoats.

The fixing unit 25 has light emitters that are arranged in the X direction in such a way as to cover the width in the rotation axis direction of the conveyor drum 21, and performs fixing operations of curing and fixing the color inks and the clear ink on the recording media P, the color inks and the clear ink having been ejected onto the recording media P, by emitting light, such as ultraviolet rays, from the light emitters to the recording media P placed on the conveyor surface 21a of the conveyor drum 21. The fixing unit 25 emits light from the light emitters at timings by emission amount based on control signals supplied from the CPU 41 of the controller 40. The fixing unit 25 is disposed on the downstream side of the head unit group HU in the conveying direction.

Usable examples of the light emitters of the fixing unit 25 include: fluorescent lamps (low-pressure mercury lamps, germicidal lamps, etc.); cold-cathode tubes; ultraviolet lasers; low-pressure, medium-pressure and high-pressure mercury lamps having an operating pressure of several hundred Pa to 1 MPa; metal halide lamps; and LEDs (Light Emitting Diodes).

The second delivery unit 26 has a ring-shaped belt 263 the inner side of which is supported by two rollers 261 and 262, and a columnar delivery drum 264 that delivers the recording media P from the conveyor drum 21 to the belt 263. The second delivery unit 26 conveys and ejects, with the belt 263, the recording media P delivered by the delivery drum 264 from the conveyor drum 21 onto the belt 263 to the sheet receiver 30.

The reversing unit 27 operates under the control of the CPU 41 when reversing the recording media P, and reverses and then passes the recording media P received from the delivery drum 264 so as to place the reversed recording media P on the conveyor surface 21a. The reversing unit 27 includes a first drum 271, a second drum 272 and a looped belt 273.

In the reversing unit 27, the recording media P are received by the first drum 271 that rotates counterclockwise in FIG. 1 from the delivery drum 264 that rotates clockwise in FIG. 1, and successively passed to the second drum 272 that rotates clockwise in FIG. 1 and then to the looped belt 273 that rotates counterclockwise in FIG. 1 in this order. When the bottom of a recording medium P arrives near a nip part of the second drum 272 and the looped belt 273, the rotation direction of the looped belt 273 is changed to the clockwise direction in FIG. 1, and the recording medium P is placed on the conveyor surface 21a of the conveyor drum 21 on the upstream side of the delivery drum 222 in the conveying direction. The recording medium P placed on the conveyor surface 21a by the reversing unit 27 is held by the conveyor drum 21 again in a state in which the side with an image formed abuts the conveyor surface 21a.

The configuration of the reversing unit 27 is not limited to the above and hence can be arbitrarily selected from various configurations that can reverse the recording media P and pass the reversed recording media P to the conveyor drum 21.

The sheet receiver 30 has a plate-shaped sheet receiving tray 31 where the recording media P ejected from the image recorder 20 by the second delivery unit 26 are placed.

FIG. 2 is a block diagram of main functional components of the ink jet recording apparatus 1.

The ink jet recording apparatus 1 includes: a controller 40 having a CPU 41 (Central Processing Unit) (hardware processor), a RAM 42 (Random Access Memory), a ROM 43 (Read Only Memory) and a storage 44; a heater 23; for each head unit 24, a recording head drive unit 241 that drives recording heads 242 of the head unit 24; for each head unit 24, an ink heater 243 that heats the ink in the head unit 24; a fixing unit 25; a conveyor drive unit 51; an interface 52; and a bus 53.

The CPU 41 reads programs for various types of control and setting data stored in the ROM 43, stores the read ones in the RAM 42, and executes the programs and thereby performs various types of arithmetic processing. Thus, the CPU 41 controls the overall operations of the ink jet recording apparatus 1.

The RAM 42 provides a memory space for work for the CPU 41 and temporarily stores data therein. The RAM 42 may contain a nonvolatile memory.

The ROM 43 stores therein the programs for various types of control to be executed by the CPU 41, the setting data and so forth. Instead of the ROM 43, a rewritable nonvolatile memory, such as an EEPROM (Electrically Erasable Programmable Read Only Memory) or a flash memory, may be used.

The storage 44 is constituted of a DRAM (Dynamic Random Access Memory) or the like. The storage 44 stores therein commands relevant to image recording (hereinafter may be referred to as the "image recording commands") and image data relevant to the image recording commands, the image recording commands and the image data being input from an external apparatus 2 via the interface 52. Each image recording command contains data indicating whether to record image(s) on one side of a recording medium P or both sides thereof. The image recording commands and the image data may be stored in the RAM 42.

Each recording head drive unit 241 causes the recording heads 242 to eject the ink on the basis of control signals and image data supplied from the CPU 41. More specifically, when the CPU 41 supplies a control signal and image data to each recording head drive unit 241, the drive control circuit of the recording head drive unit 241 causes the drive circuit thereof to output a voltage signal having a drive waveform to the piezoelectric elements of the recording elements of the recording heads 242, and thereby to cause the recording heads 242 to perform (i) the ejection operation of ejecting the amount of the ink corresponding to the image data from the nozzles of the recording elements or (ii) a non-ejection operation of not ejecting the ink (ii-a) if the image data is for no ink ejection or (ii-b) after an image recording operation finishes but before the next recording operation starts.

The conveyor drive unit 51 supplies drive signals to the conveyor drum motor for the conveyor drum 21 on the basis of control signals supplied from the CPU 41 so as to rotate the conveyor drum 21 at a predetermined speed and predetermined timings. The conveyor drive unit 51 also supplies, on the basis of control signals supplied from the CPU 41, drive signals to motors that cause the media supply unit 12, the first delivery unit 22 and the second delivery unit 26 to operate so that the recording media P are fed to the conveyor drum 21 and ejected from the conveyor drum 21. The conveyor drive unit 51 causes the first drum 271, the second drum 272 and the looped belt 273 of the reversing unit 27 to operate on the basis of control signals supplied from the CPU 41 so that the reversing unit 27 reverses the recording media P.

The interface 52 is to send and receive data to and from the external apparatus 2, and is constituted of, for example, one of or a combination of a variety of serial interfaces and a variety of parallel interfaces.

The external apparatus 2 is, for example, a personal computer, and supplies the image recording commands, the image data and so forth to the controller 40 via the interface 52.

Next, an operation to record images and an operation to form overcoats on both sides of a recording medium P in the ink jet recording apparatus 1 are described.

In the ink jet recording apparatus 1, when an image recording command to record images on both sides of a recording medium P and image data relevant to the image recording command are input to the controller 40, on the basis of the image data, at a predetermined ejection position where the head unit group HU is disposed, the head units 24Y, 24M, 24C and 24K eject their color inks, which form images, onto the front (one side) of the recording medium P, thereby recording an image thereon, and the head unit 24T ejects a clear ink onto the whole image forming region. Then, the fixing unit 25 fixes the color inks and the clear ink on the recording medium P, thereby forming an overcoat composed of the cured clear ink on the front of the recording medium P. Next, the reversing unit 27 reverses this recording medium P and places the reversed recording medium P on the conveyor surface 21a of the conveyor drum 21. Then, on the basis of the image data indicated by the image recording command, at the predetermined ejection position, the head units 24Y, 24M, 24C and 24K eject their color inks, which form images, onto the back (the other side) of the recording medium P, thereby recording an image thereon, and the head unit 24T ejects the clear ink onto the whole image forming region. Then, the fixing unit 25 fixes the color inks and the clear ink on the recording medium P, thereby forming an overcoat composed of the cured clear ink on the back of the recording medium P.

Thus, the ink jet recording apparatus 1 records images and forms overcoats on the front and the back of a recording medium P, with one conveyor drum 21, the head units 24 and the fixing unit 25.

Next, control procedure by the CPU 41 of an image recording process performed by the ink jet recording apparatus 1 is described.

Figure 3:
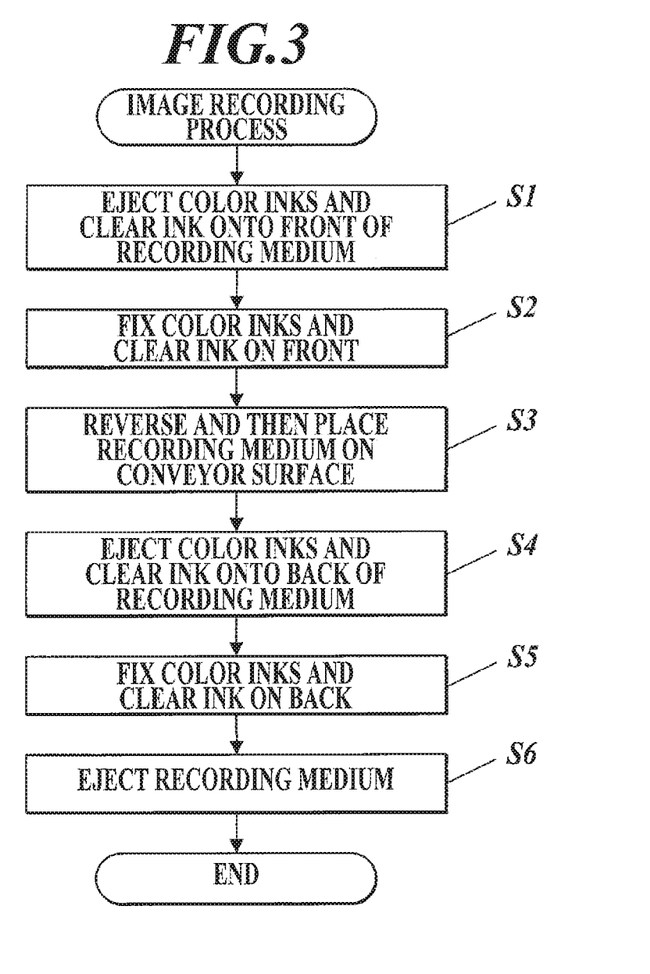
FIG. 3 is a flowchart of control procedure of an image recording process.

FIG. 3 is a flowchart of the control procedure of the image recording process.

This image recording process is performed, for example, when an image recording command to record images on both sides of a recording medium P and image data relevant to the images are input to the controller 40 from the external apparatus 2 via the interface 52.

Before this image recording process is started, the ink heaters 243 heat inks in the head units 24 to a predetermined temperature according to the type of the inks. Further, a rotational operation of the conveyor drum 21 is started, and the heater 23 heats the conveyor surface 21a of the conveyor drum 21 to a predetermined temperature. In this embodiment, the inks in the head units 24 are heated to 80° C., and the conveyor surface 21a is heated to 45° C.

When the image recording process is started, the CPU 41 causes, on the basis of the input image recording command and image data, the components of the sheet feeder 10 and the image recorder 20 to operate so that the head unit group HU ejects the color inks and the clear ink onto the front of a recording medium P that is conveyed by the conveyor drum 21 (Step S1). More specifically, the CPU 41 supplies a control signal to the conveyor drive unit 51 to cause the media supply unit 12 and the first delivery unit 22 to convey a recording medium P onto the conveyor surface 21a of the conveyor drum 21 and to cause the conveyor drum 21 to hold and convey the recording medium P. Then, the CPU 41 supplies the image data relevant to the image recording command and a control signal to each recording head drive unit 241 so that each recording head drive unit 241 outputs a voltage signal having a drive waveform to the recording heads 242 at an appropriate timing according to the rotation of the conveyor drum 21, thereby causing the recording heads 242 of the respective head units 24 to eject the inks onto the front of the recording medium P that is conveyed by the conveyor drum 21. Here, the CPU 41 causes the head units 24Y, 24M, 24C and 24K to eject the color inks, which form images, on the basis of the image data, thereby recording an image, and next, causes the head unit 24T to eject the clear ink onto the whole image forming region on the basis of the solid image data.

The CPU 41 causes the fixing unit 25 to emit, at an appropriate timing according to the rotation of the conveyor drum 21, ultraviolet rays to the recording medium P conveyed to a position to face the fixing unit 25, thereby curing the color inks and the clear ink on the recording medium P and fixing the color inks and the clear ink on the front of the recording medium P accordingly (Step S2). This forms an overcoat composed of the cured clear ink on the front of the recording medium P.

The CPU 41 causes the reversing unit 27 to reverse the recording medium P with the overcoat formed on the front and place the reversed recording medium P on the conveyor surface 21*a* of the conveyor drum 21 (Step S3). More specifically, the CPU 41 supplies a control signal to the conveyor drive unit 51 to cause the delivery drum 264 as well as the first drum 271, the second drum 272 and the looped belt 273 of the reversing unit 27 to operate so that the reversing unit 27 reverses the recording medium P, which has been on the conveyor surface 21*a*, and places the reversed recording medium P on the conveyor surface 21*a* on the upstream side of the delivery drum 222 in the conveying direction.

The CPU 41 causes, on the basis of the input image recording command and image data, the components of the sheet feeder 10 and the image recorder 20 to operate so that the head unit group HU ejects the color inks and the clear ink onto the back of the recording medium P that is conveyed by the conveyor drum 21 (Step S4). Step S4 is the same as Step S1 except that the inks are ejected on the basis of the image data for the back.

The CPU 41 causes the fixing unit 25 to emit ultraviolet rays to the recording medium P conveyed to the position to face the fixing unit 25, thereby curing the color inks and the clear ink on the recording medium P and fixing the color inks and the clear ink on the back of the recording medium P accordingly (Step S5). This forms an overcoat composed of the cured clear ink on the back of the recording medium P.

The CPU 41 supplies a control signal to the conveyor drive unit 51 to cause the second delivery unit 26 to operate so that the second delivery unit 26 conveys the recording medium P with the images recorded and the overcoats formed on the front and the back to the sheet receiver 30, thereby ejecting the recording medium P (Step S6).

As described above, the ink jet recording apparatus 1 according to the embodiment(s) includes: the head unit group HU that performs an ejection operation of ejecting a color ink(s) that forms an image and a clear ink onto a recording medium P; the fixing unit 25 that performs a fixing operation of fixing the clear ink ejected onto the recording medium P by the head unit group HU, thereby forming an overcoat(s) on the recording medium P; the reversing unit 27 that reverses the recording medium P; and the CPU 41 (hardware processor), wherein the CPU 41 causes the fixing unit 25 to form an overcoat on one side of the recording medium P after causing the head unit group HU to perform the ejection operation on the one side at a predetermined ejection position, causes the reversing unit 27 to reverse the recording medium P with the overcoat formed on the one side, and causes the fixing unit 25 to form an overcoat on the other side of the recording medium P opposite to the one side after causing the head unit group HU to perform the ejection operation on the other side at the predetermined ejection position. With this process, one head unit group HU and one fixing unit 25 record images and form overcoats on one side and the other side of a recording medium P. Hence, the ink jet recording apparatus 1, which records images and forms overcoats on both sides of a recording medium, can be configured to be small, which results in low cost.

Further, the fixing unit 25 emits an energy ray(s) that cures and fixes the clear ink. This can readily cure and fix the clear ink on the recording medium P by a noncontact method, without exerting unnecessary influence on the clear ink.

Further, the head unit group HU ejects the color ink(s) that is fixed together with the clear ink by the fixing unit 25. This eliminates a need to provide separate fixing units to fix the color ink(s) and the clear ink. Hence, the ink jet recording apparatus 1 can be configured to be smaller, which results in lower cost, and also can fix the color ink(s) and the clear ink efficiently.

Further, the fixing unit 25 emits an energy ray(s) that cures and fixes the color ink(s) and the clear ink. This can readily cure and fix the color ink(s) and the clear ink on the recording medium P by a noncontact method, without exerting unnecessary influence on the clear ink.

Further, the ink jet recording apparatus 1 further includes the ink heater 243 that heats the color inks stored in the head units 24Y, 24M, 24C and 24K of the head unit group HU, wherein the color inks have a property of being a gel at room temperature and solating by heat, and the CPU 41 (hardware processor) causes the head units 24Y, 24M, 24C and 24K of the head unit group HU to eject the color inks made to solate by being heated by the ink heater 243 onto the recording medium P. According to this configuration, the color inks ejected onto the recording medium P gelatinize by being cooled to the gelation temperature or less. This can suppress liquid gathering of the color inks of different colors and suppress decrease in the image quality of the recorded images caused by liquid gathering of the color inks and the clear ink. In particular, when the surface of the recording medium P has a temperature equal to or less than the gelation temperature, the ejected color inks are rapidly cooled and thereby gelatinize. This can suppress decrease in the image quality of the recorded images more efficiently.

Further, the ink jet recording apparatus 1 includes the ink heater 243 that heats the clear ink stored in the head unit 24T of the head unit group HU, wherein the clear ink has a property of being a gel at room temperature and solating by heat, and the CPU 41 (hardware processor) causes the head unit 24T of the head unit group HU to eject the clear ink made to solate by being heated by the ink heater 243 onto the recording medium P. Accordingly, the clear ink ejected onto the recording medium P gelatinizes by being cooled to the gelation temperature or less. This makes the ejected clear ink hardly flows/moves on the recording medium P, and hence can form the overcoats on a desired region(s), and also can suppress decrease in the image quality of the recorded images caused by liquid gathering of the color inks and the clear ink. In particular, when the surface of the recording medium P has a temperature equal to or less than the gelation temperature, the ejected clear ink is rapidly cooled and thereby gelatinizes. This can form the overcoats on a desired region(s) more accurately, and also can suppress decrease in the image quality of the recorded images more efficiently.

Further, the head unit 24T ejects the clear ink onto the recording medium P after the head units 24Y, 24M, 24C and 24K eject the color inks onto the recording medium P. This can protect the surface of the recording medium P and the surface of the color inks on the recording medium P by covering them with the overcoats composed of the cured clear ink, and also can provide the overcoat forming region of the recording medium P with gloss by the overcoats.

Further, the ink jet recording apparatus 1 further includes the conveyor drum 21 that conveys the recording medium P, wherein the head unit group HU performs the ejection operation on the recording medium P being conveyed by the conveyor drum 21, and the fixing unit 25 fixes the clear ink on the recording medium P being conveyed by the conveyor drum 21, thereby forming the overcoats. According to this configuration, one conveyor drum 21, one head unit group HU and one fixing unit 25 record images and form overcoats on one side and the other side of the recording medium P. Hence, the ink jet recording apparatus 1, which records images and forms overcoats on both sides of a recording medium, can be configured to be small, which results in low cost.

(First Modification)

Next, a first modification of the above embodiment is described.

This first modification is different from the above embodiment in a point that the head unit 24T ejects the clear ink onto only a part of the image forming region of a recording medium P, but the same as the above embodiment in the other points. Hereinafter, the different point from the embodiment is described.

In the first modification, the head unit 24T ejects the clear ink in such a way as to cover a region where the amount of the color inks ejected by the head units 24Y, 24M, 24C and 24K (color ink ejection amount) per predetermined area is less than a predetermined reference ejection amount in the image forming region of a recording medium P. The predetermined reference ejection amount is arbitrarily set, for example, within a range of the color ink ejection amount per predetermined area, the range in which a sufficient effect of protecting a recording medium P with the color inks ejected onto and cured on the recording medium P can be obtained. As the value of the predetermined reference ejection amount is lower, the clear ink amount used is reduced. Further, the predetermined area may be the area of one of the regions into which the image forming region of a recording medium P is equally divided to have the same area. For example, the predetermined area may be the area of a region corresponding to one pixel in image data of a recorded image. In order to eject the clear ink in this mode, for example, of the solid image data, which is used for ejection of the clear ink, a specific part is masked, and on the basis of the masked solid image data, the head unit 24T ejects the clear ink. The specific part corresponds to a part where the sum of Y, M, C and K image data of corresponding pixels in the Y, M, C and K image data is equal to or more than a value corresponding to the reference ejection amount (if the data system is as follows: the larger the value of image data is, the larger the ink ejection amount is).

In another mode of the first modification, the head unit 24T ejects the clear ink in such a way as to cover a region where the color inks are not ejected by the head units 24Y, 24M, 24C and 24K in the image forming region of a recording medium P. In order to eject the clear ink in this mode, for example, of the solid image data, which is used for ejection of the clear ink, a specific part is masked, and on the basis of the masked solid image data, the head unit 24T ejects the clear ink. The specific part corresponds to a part where at least one of Y, M, C and K image data of corresponding pixels in the Y, M, C and K image data is data for ink ejection. In this case, the clear ink is ejected to the region excluding the whole region where the color ink(s) are ejected. Alternatively, the clear ink may be ejected to the region excluding some of the region where the color ink(s) are ejected. For example, the clear ink may be ejected to cover the region where the color inks are not ejected and to the region that contains the border of the region where the color ink(s) are ejected.

As described above, in the ink jet recording apparatus 1 according to the first modification, the CPU 41 (hardware processor) causes the head unit 24T to eject the clear ink in such a way as to cover a region where an amount of the color inks ejected by the head units 24Y, 24M, 24C and 24K per predetermined area is less than a predetermined reference ejection amount in the image forming region of a recording medium P. This can protect every point of the image forming region of the recording medium P with at least one of the cured color ink(s) and the cured clear ink while reducing the consumption of the clear ink. Further, this can make the thickness of the ink composed of the color inks and the clear ink more uniform than the mode in which the clear ink is ejected to the whole image forming region of a recording medium P, and consequently can make gloss on the recording medium P more uniform than the mode.

Further, the CPU 41 (hardware processor) causes the head unit 24T to eject the clear ink in such a way as to cover a region where the color inks are not ejected by the head units 24Y, 24M, 24C and 24K in the image forming region of a recording medium P. This can further reduce the consumption of the clear ink.

(Second Modification)

Next, a second modification of the above embodiment is described.

This second modification is different from the above embodiment in a point that the head unit 24T ejects a smaller amount of the clear ink to a region where the amount of the color inks ejected by the head units 24Y, 24M, 24C and 24K is larger of a recording medium P, but the same as the above embodiment in the other points. Hereinafter, the different point from the embodiment is described.

Figure 4:
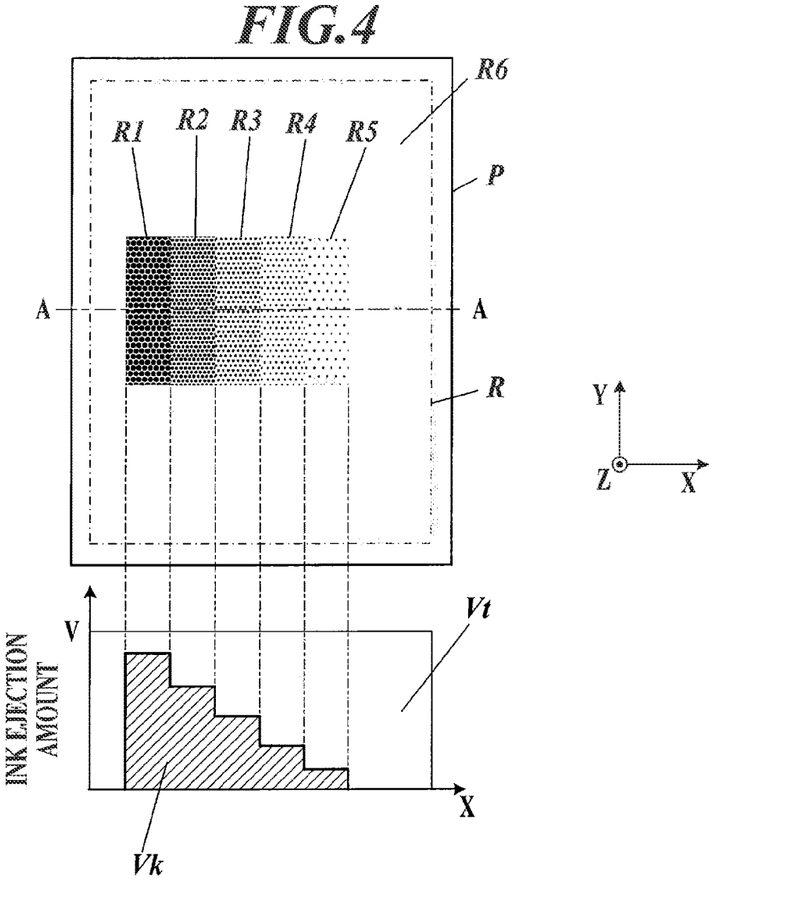
FIG. 4 shows an example of a color ink ejection amount and a clear ink ejection amount to a recording medium in a second modification.

FIG. 4 shows an example of the color ink ejection amount and the clear ink ejection amount to a recording medium P in the second modification.

On the recording medium P shown at the upper part in FIG. 4, a monotone image is recorded in an image forming region R by the head unit 24K ejecting black ink. This image is composed of a black region R1, grey regions R2 to R5 arranged in this order in the +X direction with respect to the region R1, and a white region R6 that is contained in the image forming region R and encloses the regions R1 to R5. Each of the regions R2 to R5 has uniform brightness, and the brightness gradually decreases from the region R2 to the region R5.

The diagram shown at the lower part in FIG. 4 shows the black ink ejection amount and the clear ink ejection amount to the recording medium P to points on the A-A line in the X direction of the recording medium P shown at the upper part in FIG. 4. In this diagram, the black color ejection amount by the head unit 24K to each point in the X direction is expressed by the height of the oblique-line part Vk, and the clear ink ejection amount by the head unit 24T to each point in the X direction is expressed by the height of the blank part Vt.

The black ink ejection amount is the largest at the point corresponding to the region R1 and has a distribution in which the black ink ejection amount gradually decreases from the point corresponding to the region R1 to the point corresponding to the region R5. In each of the region R1 to R5, the black ink ejection amount is the same. To the point corresponding to the region R6, the black ink is not ejected.

The clear ink ejection amount to each of the regions R1 to R6 is determined according to the black ink ejection amount to each of the regions R1 to R6 such that the sum of the black ink ejection amount and the clear ink ejection amount to each region is an ejection amount V, namely, the same. Hence, the clear ink ejection amount to the point corresponding to the region R6 is the ejection amount V.

In order to eject the clear ink in this mode, for example, of the clear ink image data, which is used for ejection of the clear ink, data of a pixel corresponding to corresponding pixels in Y, M, C and K image data is set on the basis of data of the corresponding pixels in the Y, M, C and K image data, and on the basis of the obtained clear ink image data, the head unit 24T ejects the clear ink. The data of a pixel in the clear ink image data is a value obtained by subtracting the sum of data of its corresponding pixels in the Y, M, C and K image data from a predetermined value corresponding to the ejection amount V.

This can make the thickness of the ink composed of the color inks and the clear ink ejected to each point on a recording medium P more uniform than the above embodiment in which the same amount of the clear ink is ejected to each point on a recording medium P regardless of the color ink ejection amount, and consequently makes the height of the surface of an overcoat(s) composed of the cured clear ink more uniform than the embodiment.

In the above, a monotone image composed of the black ink only is recorded, but a monotone image in another color may be recorded. Alternatively, a color image may be recorded by ejection of inks of multiple colors. In this case, the clear ink ejection amount to each point of the image forming region is set such that the sum of the color ink ejection amount of all the color inks and the clear ink ejection amount is the same at each point of the image forming region.

The second modification may be combined with the first modification. That is, the head unit 24T may eject the clear ink onto, of a recording medium P, the region where the color ink ejection amount per unit area is less than a predetermined value and eject a smaller amount of the clear ink to a point where the amount of the color inks ejected (i.e. the color ink ejection amount) is larger.

As described above, in the ink jet recording apparatus 1 according to the second modification, the CPU 41 (hardware processor) causes the head unit 24T to eject a smaller amount of the clear ink to a region where an amount of the color inks ejected by the head units 24Y, 24M, 24C and 24K is larger in the image forming region of a recording medium P. This can make the thickness of the ink composed of the color inks and the clear ink on a recording medium P more uniform than the mode in which the same amount of the clear ink is ejected to each point on a recording medium P, and consequently can make gloss on the recording medium P more uniform than the mode.

The present invention is not limited to the above embodiment and modifications and hence can be modified in a variety of aspects.

For example, in the above embodiment and modifications, the fixing unit 25 fixes the color inks and the clear ink, but not limited thereto. The fixing unit 25 may fix the clear ink only. In this case, a separate fixing unit may be provided to fix the color inks. Alternatively, for example, if the color inks are those permeable to the recording media P and immovable accordingly when ejected onto the recording media P, no fixing unit may be provided to fix the color inks.

Further, in the above embodiment and modifications, the color inks and the clear ink that change between the gel phase and the sol phase are used, but not limited thereto. For example, color inks that change between the gel phase and the sol phase may be used as the color inks, and a clear ink that does not perform the above phase change may be used as the clear ink. In this case, the color inks solidify when ejected onto the recording media P and cooled. This can suppress the problem of liquid gathering of the color inks and the clear ink when the clear ink is ejected onto the color inks, and can widen the range of choice of the composition of the clear ink.

Alternatively, color inks that do not perform the above phase change may be used as the color inks. The clear ink in this case can be arbitrarily selected from inks that perform the above phase change and inks that do not perform the above phase change by taking possibility of liquid gathering with the color inks and fluidity after ejection onto the recording media P into account.

Further, in the above embodiment and modifications, to record an image and form an overcoat on the back of a recording medium P, the recording medium P reversed by the reversing unit 27 is placed on the conveyor surface 21a of the conveyor drum 21 on the upstream side of the head unit group HU in the conveying direction, but not limited thereto. For example, the reversed recording medium P may be placed on any point on the conveyor surface 21a, and the conveyor drum 21 may be rotated until the recording medium P reaches a position to face the head units 24. If the conveyor drum 21 is rotatable in the opposite direction to that in the above embodiment, the conveyor drum 21 may be rotated in this opposite direction to convey the recording medium P to the position to face the head units 24.

Further, in the above embodiment and modifications, the color inks and the clear ink are cured and fixed on the recording media P by emission of light, such as ultraviolet rays, from the fixing unit 25, but not limited thereto. For example, thermosetting inks may be used as the color inks and/or the clear ink, and heated, cured and fixed on the recording media P by emission of inferred rays (heat rays) as the energy rays from the fixing unit 25.

Further, the fixing unit 25, which emits the energy rays, may be replaced by, for example, a fixing unit that sends air to evaporate solvents of inks and fixes the inks on the recording media P.

Further, in the above embodiment and modifications, the conveyor used is the conveyor drum 21, but not limited thereto. For example, the conveyor may be a conveyor having a belt that is supported by two rollers and circling around the two rollers according to the rotation(s) of the rollers, wherein the recording media P are placed on the conveyor surface of the belt.

Further, in the above embodiment and modifications, the ejection operation of the head unit group HU and the fixing operation of the fixing unit 25 are performed on the recording media P that are moving by the rotation of the conveyor drum 21, but not limited thereto. When the head unit group HU performs the ejection operation and/or when the fixing unit 25 performs the fixing operation, the rotation of the conveyor drum 21 may be suspended. Thus, the recording media P being conveyed by the conveyor drum 21 include the recording media P being held by the conveyor drum 21 that is not rotating.

The recording media P are not necessarily being conveyed by the conveyor. For example, the ejection operation of the head unit group HU and the fixing operation of the fixing unit 25 may be performed on the front of a recording medium P placed on a predetermined media placement part, and after the reversing unit reverses this recording medium P, the ejection operation of the head unit group HU and the fixing operation of the fixing unit 25 may be performed on the back of the recording medium P placed on the media placement part.

Further, in the above embodiment and modifications, the ink jet recording apparatus 1 employs the single-pass system. Alternatively, the present invention may be applied to an ink jet recording apparatus that records images while scanning recording heads.

Although some embodiments of the present invention are described, the scope of the present invention is not limited to the above embodiments but includes the scope of claims and the scope of their equivalents.

Although embodiments of the present invention have been described and illustrated in detail, it is clearly understood that the same is by way of illustration and example only and is not to be taken by way of limitation, and the scope of the present invention should be interpreted by terms of the appended claims.

INDUSTRIAL APPLICABILITY

The present invention is applicable to an ink jet recording apparatus.

DESCRIPTION OF REFERENCE NUMERALS

1 Ink Jet Recording Apparatus
2 External Apparatus
10 Sheet Feeder
11 Sheet Feeding Tray
12 Media Supply Unit
20 Image Recorder
21 Conveyor Drum
21a Conveyor Surface
22 First Delivery Unit
23 Heater
24, 24Y, 24M, 24C, 24K, 24T Head Unit
241 Recording Head Drive Unit
242 Recording Head
243 Ink Heater
25 Fixing Unit
26 Second Delivery Unit
27 Reversing Unit
30 Sheet Receiver
31 Sheet Receiving Tray
40 Controller
41 CPU
42 RAM
43 ROM
44 Storage
51 Conveyor Drive Unit
52 Interface
53 Bus
HU Head Unit Group
P Recording Medium

The invention claimed is:

1. An ink jet recording apparatus comprising:
a conveyor that conveys a recording medium;
an ejector that performs an ejection operation of ejecting a color material that forms an image and an overcoat material onto the recording medium;
a fixing unit that fixes the overcoat material ejected onto the recording medium by the ejector, thereby forming an overcoat on the recording medium;
a reversing unit that reverses the recording medium; and
a hardware processor that causes the fixing unit to form the overcoat on one side of the recording medium being conveyed by the conveyor after causing the ejector to perform the ejection operation on the one side of the recording medium being conveyed by the conveyor at a predetermined ejection position, causes the reversing unit to remove the recording medium from the conveyor downstream of the fixing unit and reverse the recording medium with the overcoat formed on the one side, causes the reversing unit to place the reversed recording medium on the conveyor upstream of the ejector, and causes the fixing unit to form the overcoat on other side of the recording medium opposite to the one side after causing the ejector to perform the ejection operation on the other side at the predetermined ejection position".

2. The ink jet recording apparatus according to claim 1, wherein the fixing unit emits an energy ray that cures and fixes the overcoat material.

3. The ink jet recording apparatus according to claim 1, wherein the ejector ejects the color material that is fixed together with the overcoat material by the fixing unit.

4. The ink jet recording apparatus according to claim 3, wherein the fixing unit emits an energy ray that cures and fixes the color material and the overcoat material.

5. The ink jet recording apparatus according to claim 1, further comprising a color material heater that heats the color material stored in the ejector, wherein
the color material has a property of being a gel at room temperature and solating by heat, and
the hardware processor causes the ejector to eject the color material made to solate by being heated by the color material heater onto the recording medium.

6. The ink jet recording apparatus according to claim 1, further comprising an overcoat material heater that heats the overcoat material stored in the ejector, wherein
the overcoat material has a property of being a gel at room temperature and solating by heat, and
the hardware processor causes the ejector to eject the overcoat material made to solate by being heated by the overcoat material heater onto the recording medium.

7. The ink jet recording apparatus according to claim 1, wherein the ejector ejects the overcoat material onto the recording medium after the ejector ejects the color material onto the recording medium.

8. The ink jet recording apparatus according to claim 1, wherein the hardware processor causes the ejector to eject the overcoat material in such a way as to cover a region where an amount of the color material ejected by the ejector per predetermined area is less than a predetermined reference ejection amount in an image forming region of the recording medium.

9. The ink jet recording apparatus according to claim 1, wherein the hardware processor causes the ejector to eject the overcoat material in such a way as to cover a region where the color material is not ejected by the ejector in an image forming region of the recording medium.

10. The ink jet recording apparatus according to claim 1, wherein the hardware processor causes the ejector to eject a smaller amount of the overcoat material to a region where an amount of the color material ejected by the ejector is larger in an image forming region of the recording medium.

11. The ink jet recording apparatus according to claim 1, wherein the fixing unit fixes the overcoat material on the recording medium being conveyed by the conveyor, thereby forming the overcoat.

12. The ink jet recording apparatus according to claim 1, wherein the conveyor is a conveyor drum having a conveyor surface that is a cylindrical outer circumferential surface, the conveyor conveys the recording media while holding the recording medium on the conveyor surface.

13. The ink jet recording apparatus according to claim 1, further comprising a delivery unit that receives the recording medium from the conveyor, wherein the hardware processor causes the reversing unit to receive the recording medium from the delivery unit after the ejector performs the ejection operation on the one side of the recording medium.

14. The inkjet recording apparatus according to claim 13, wherein the delivery unit further comprises a belt supported by two rollers, and the hardware processor causes the belt to receive the recording medium after causing the fixing unit to form the overcoat on the other side of the recording medium and deliver the recording medium to a sheet receiving tray.

15. The inkjet recording apparatus according to claim 1, wherein the reversing unit includes a first drum that receives the recording medium with the overcoat formed on the one side from the conveyor, a second drum, and a looped belt, wherein the looped belt and the second drum place the reversed recording medium on the conveyor upstream of the ejector.

* * * * *